United States Patent
Oh et al.

(10) Patent No.: US 10,788,946 B2
(45) Date of Patent: *Sep. 29, 2020

(54) DISPLAY APPARATUS, SOURCE APPARATUS, AND METHODS OF PROVIDING CONTENT

(71) Applicant: SAMSUNG ELECTRONICS CO., LTD., Suwon-si (KR)

(72) Inventors: Sung-bo Oh, Seoul (KR); Young-taek Yoo, Hwaseong-si (KR); Na-rae Yun, Suwon-si (KR); Jun-ho Lim, Dongducheon-si (KR); Hyoung-woo Jeon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

This patent is subject to a terminal disclaimer.

(21) Appl. No.: 16/053,408

(22) Filed: Aug. 2, 2018

(65) Prior Publication Data

US 2018/0348919 A1 Dec. 6, 2018

Related U.S. Application Data

(62) Division of application No. 13/781,842, filed on Mar. 1, 2013, now Pat. No. 10,061,465.

(30) Foreign Application Priority Data

Mar. 13, 2012 (KR) .................. 10-2012-0025628

(51) Int. Cl.
*G06F 3/048* (2013.01)
*G09G 5/00* (2006.01)
(Continued)

(52) U.S. Cl.
CPC ............ *G06F 3/048* (2013.01); *G09G 5/003* (2013.01); *H04N 21/4122* (2013.01);
(Continued)

(58) Field of Classification Search
CPC ....... G09G 2320/0613; G09G 2320/08; G09G 5/003; G09G 5/391; G09G 3/048;
(Continued)

(56) References Cited

U.S. PATENT DOCUMENTS 6,999,129 B2 2/2006 Shirahama et al.
7,212,218 B2 5/2007 Suzuki et al.
(Continued)

FOREIGN PATENT DOCUMENTS

CN 1324179 A 11/2001
CN 1685715 A 10/2005
(Continued)

OTHER PUBLICATIONS

Communication dated Apr. 24, 2017, from the European Patent Office in counterpart European Application No. 13159015.0.
(Continued)

*Primary Examiner* — Jason M Mandeville
(74) *Attorney, Agent, or Firm* — Sughrue Mion, PLLC

(57) ABSTRACT

A display apparatus, a source apparatus, and methods of providing content are provided. The display apparatus includes: a receiver which receives content data; a storage which stores frame size information corresponding to a content type; a detector which detects the content type of the content data; a video processor which forms a content frame having a frame size corresponding to the detected content type by using the frame size information stored in the storage; and a display which displays the content frame formed by the video processor.

20 Claims, 7 Drawing Sheets

(51) Int. Cl.
*H04N 21/41* (2011.01)
*H04N 21/431* (2011.01)
*H04N 21/4402* (2011.01)
*H04N 21/475* (2011.01)
*H04N 21/485* (2011.01)
*G09G 5/391* (2006.01)
*H04N 21/4363* (2011.01)
*H04N 21/478* (2011.01)
*H04N 21/4782* (2011.01)
*H04N 21/81* (2011.01)

(52) U.S. Cl.
CPC . *H04N 21/4312* (2013.01); *H04N 21/440263* (2013.01); *H04N 21/4755* (2013.01); *H04N 21/4858* (2013.01); *G09G 5/391* (2013.01); *G09G 2320/0613* (2013.01); *G09G 2320/08* (2013.01); *G09G 2340/045* (2013.01); *G09G 2360/02* (2013.01); *G09G 2370/04* (2013.01); *G09G 2370/12* (2013.01); *H04N 21/43635* (2013.01); *H04N 21/4781* (2013.01); *H04N 21/4782* (2013.01); *H04N 21/4852* (2013.01); *H04N 21/8153* (2013.01)

(58) Field of Classification Search
CPC ........... G09G 2370/12; G09G 2370/04; G09G 2360/02; G09G 2340/045; H04N 21/2343; H04N 21/4122; H04N 21/4312; H04N 21/43635; H04N 21/440263; H04N 21/4755; H04N 21/4781; H04N 21/4782; H04N 21/4852; H04N 21/4858; H04N 21/8153
USPC .......................................... 345/698, 3.3, 204
See application file for complete search history.

(56) References Cited

U.S. PATENT DOCUMENTS

| | | | |
|---|---|---|---|
| 7,483,960 B2 | 1/2009 | Kyusojin | |
| 8,284,324 B2 | 10/2012 | Horikoshi | |
| 8,373,700 B2 | 2/2013 | Terada et al. | |
| 10,061,465 B2 * | 8/2018 | Oh | H04N 21/440263 |
| 2002/0071493 A1 | 6/2002 | Shirahama et al. | |
| 2003/0065716 A1 | 4/2003 | Kyusojin | |
| 2005/0151884 A1 | 7/2005 | Oh | |
| 2005/0190202 A1 | 9/2005 | Suzuki et al. | |
| 2005/0262444 A1 | 11/2005 | Kizaki et al. | |
| 2006/0012616 A1 | 1/2006 | Paek | |
| 2006/0017844 A1 | 1/2006 | Iwaki | |
| 2006/0139379 A1 | 6/2006 | Toma et al. | |
| 2006/0221246 A1 | 10/2006 | Yoo | |
| 2008/0084503 A1 | 4/2008 | Kondo | |
| 2008/0231756 A1 | 9/2008 | Kondo et al. | |
| 2009/0003731 A1 | 1/2009 | Nitta | |
| 2010/0026685 A1 | 2/2010 | Terada et al. | |
| 2010/0158099 A1 | 6/2010 | Kalva et al. | |
| 2010/0180312 A1 | 7/2010 | Toya | |
| 2011/0059794 A1 | 3/2011 | Yamaguchi | |
| 2011/0102627 A1 | 5/2011 | Okada | |
| 2011/0122063 A1 | 5/2011 | Perlman et al. | |
| 2011/0249194 A1 | 10/2011 | Horikoshi | |
| 2011/0252085 A1 | 10/2011 | Mase et al. | |
| 2012/0242687 A1 | 9/2012 | Choi | |
| 2013/0100247 A1 | 4/2013 | Tsukagoshi | |

FOREIGN PATENT DOCUMENTS

| | | |
|---|---|---|
| CN | 1842142 A | 10/2006 |
| CN | 1881069 A | 12/2006 |
| EP | 1156670 A2 | 11/2001 |
| EP | 2587811 A1 | 5/2013 |
| EP | 1 475 964 A1 | 11/2014 |
| JP | 2001-257964 A | 9/2001 |
| JP | 2003-85086 A | 3/2003 |
| JP | 2005-338185 A | 12/2005 |
| JP | 2007-140436 A | 6/2007 |
| JP | 2008-5428 A | 1/2008 |
| JP | 2008-146190 A | 6/2008 |
| JP | 2008-258698 A | 10/2008 |
| JP | 2009-116421 A | 5/2009 |
| JP | 2010-41336 A | 2/2010 |
| JP | 2010-283790 A | 12/2010 |
| JP | 2011-223457 A | 11/2011 |
| WO | 2011/162087 A1 | 12/2011 |

OTHER PUBLICATIONS

Communication dated Feb. 28, 2017, from the State Intellectual Property Office of People's Republic of China in counterpart Application No. 201310077502.X.

Communication dated Mar. 14, 2017, from the Japanese Patent Office in counterpart application No. 2013-048933.

Communication dated Nov. 3, 2016 issued by European Patent Office in counterpart European Application No. 13 159 015.0.

Communication dated Sep. 19, 2017, issued by the State Intellectual Property Office of P.R. China in Chinese application No. 201310077502.X.

Communication issued Feb. 12, 2016, issued by the Korean Intellectual Property Office in counterpart Korean Patent Application No. 10-2012-0025628.

Communication dated Jul. 11, 2013 issued by the European Patent Office in counterpart Application No. 13159015.0.

* cited by examiner

DISPLAY APPARATUS, SOURCE APPARATUS, AND METHODS OF PROVIDING CONTENT

CROSS-REFERENCE TO RELATED APPLICATION(S)

This is a divisional of U.S. patent application Ser. No. 13/781,842, filed on Mar. 1, 2013, now U.S. Pat. No. 10,061,465, which claims priority under 35 U.S.C. § 119 from Korean Patent Application No. 10-2012-0025628, filed on Mar. 13, 2012, in the Korean Intellectual Property Office, the disclosures of which are incorporated herein by reference in their entireties.

BACKGROUND

1. Field

The present general inventive concept generally relates to a technology which transmits content between apparatuses and displays the content, and more particularly, to a display apparatus which displays content in an optimal state on a display screen according to a type of content, a source apparatus, and methods of providing content.

2. Description of the Related Art

In general, a display apparatus such as a digital TV is provided with and displays various types of content, such as moving pictures, photos, games, or the like, through a source apparatus such as a set-top box or through a network.

The display apparatus which displays various types of content as described above displays received content without considering or adapting to the type of content that is being displayed. In this case, content including noise is displayed on a screen.

Therefore, in order to respectively display the content in optimal screen sizes, a user directly sets screen sizes of each of the content that is received, respectively. Whenever the types of displayed content are changed as described above, the user sets screen sizes appropriate for the changed types of the content. Therefore, after a predetermined use time elapses, the user views the content without setting the screen sizes. As a result, the display apparatus has an application limit.

Also, an inexperienced user lacks a basic knowledge of types of content and may be inexperienced in setting of screen sizes and thus cannot view the content in an optimal state.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus which displays content in an optimal state on a display screen according to the type of the content, a source apparatus, and methods of providing content.

According to an aspect of the exemplary embodiments, there is provided a display apparatus including: a receiver which receives content data; a storage unit which stores frame size information corresponding to a content type; a detector which detects the content type of the content data; a video processor which forms a content frame having a frame size corresponding to the detected content type by using the frame size information stored in the storage unit; and a display unit which displays the content frame formed by the video processor.

The display apparatus may further include: an input unit which receives a setting command; and a controller which, if the setting command is input, controls the display unit to display a user interface (UI), which is used to set a frame size of each content type of a plurality of content types, and, if a frame size is set on the UI, stores set frame size information in the storage unit.

The display apparatus may further include: an audio processor which detects audio data of the content data to generate an audio signal; and an audio output unit which outputs the audio signal, wherein the storage unit stores audio setting information corresponding to the content type, and the audio processor generates the audio signal having an output characteristic corresponding to the audio setting information stored in the storage unit.

If the content data is moving picture content, the video processor may form a content frame having a frame size greater than a size of a display screen of the display unit according to the frame size information stored in the storage unit.

If the content data is webpage content, the video processor may form a content frame having a frame size corresponding to the size of the display screen of the display unit according to the frame size information stored in the storage unit.

According to another aspect of the exemplary embodiments, there is provided a source apparatus which provides content to a display apparatus. The source apparatus may include: an interface unit which receives characteristic information of the display apparatus; a determiner which determines whether a frame size of the content is adjustable in the display apparatus, by using the characteristic information; and a controller which, if it is determined that the frame size of the content is adjustable in the display apparatus, controls the interface unit to transmit content data including type information of the content to the display apparatus.

The source apparatus may further include: a content processor which adjusts the frame size of the content, wherein if it is determined that the frame size of the content is not adjustable in the display apparatus, the controller controls the content processor to adjust the frame size of the content according to a size of a display screen of the display apparatus and a type of the content and transmits the content data having the adjusted frame size to the display apparatus through the interface unit.

The controller may transmit a message, which indicates that the frame size of the content has been adjusted, to the display apparatus through the interface unit.

According to another aspect of the exemplary embodiments, there is provided a method of providing content in a display apparatus. The method may include: receiving content data; detecting a content type of the content data; forming a content frame having a frame size corresponding to the detected content type from a storage unit which stores frame size information corresponding to each content type of a plurality of content types; and displaying the content frame.

The method may further include: receiving a setting command; if the setting command is input, displaying a UI which is used to set a frame size of each content type; and if the frame size is set on the UI, storing set frame size information in a storage unit.

The method may further include: detecting audio data of the content data; converting the audio data into an audio signal; and outputting the audio signal, wherein the audio data is converted into the audio signal having an output characteristic corresponding to audio setting information stored in the storage unit.

If the content data is a moving picture content, a content frame having a frame size greater than a size of the screen of the display apparatus may be formed according to the frame size information stored in the storage unit.

If the content data is a webpage, a content frame having a frame size corresponding to the size of the screen of the display apparatus may be formed according to the frame size information stored in the storage unit.

According to another aspect of the exemplary embodiments, there is provided a method of providing content from a source apparatus to a display apparatus. The method may include: receiving characteristic information of the display apparatus; determining whether a frame size of the content is adjustable in the display apparatus, by using the characteristic information; and if it is determined that the frame size of the content is adjustable in the display apparatus, transmitting content data including type information of the content to the display apparatus.

If it is determined that the frame size of the content is not adjustable in the display apparatus, the frame size of the content may be adjusted according to a size of a display screen of the display apparatus and a type of the content, and then the content having the adjusted frame size is transmitted to the display apparatus.

Content data including a message, which indicates that the frame size of the content has been adjusted, may be transmitted to the display apparatus.

According to another aspect of the exemplary embodiments, there is provide a display apparatus including: a storage which stores frame size information corresponding to a content type; a detector which detects the content type of content data; and a video processor which forms a content frame having a frame size corresponding to the detected content type by using the frame size information stored in the storage.

The content data may include an AVI infoframe including the content type.

According to another aspect of the exemplary embodiments, there is provide a display apparatus including: a receiver which receives content; a storage which stores scaling information matched for each content type; a detector which detects a content type of the received content; a scaler which adjusts a size of the content using the scaling information stored in the storage; and a display which displays the content of which size is adjusted.

As described above, according to the various exemplary embodiments, a display apparatus may adaptively adjust a screen size of content according to a type of the content to display the content in an optimal state. Also, a source apparatus may adjust a frame size of the content so that the frame size of the content is appropriate for the screen size of the display apparatus, according to whether the display apparatus may adjust a screen size of each content type. As described above, the display apparatus and the source apparatus may adaptively adjust the screen size of each content type. Therefore, a user may resolve an inconvenience of adjusting a screen size of content whenever a type of the content is changed.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
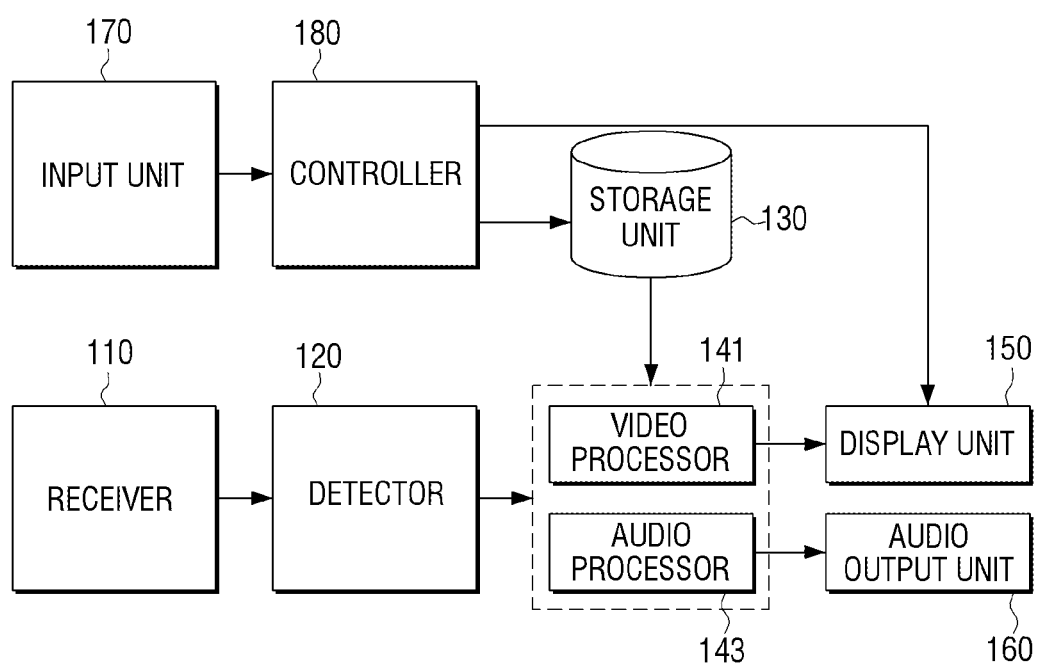
FIG. 1 is a block diagram of a display apparatus according to an exemplary embodiment.

Exemplary embodiments will be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram of a display apparatus according to an exemplary embodiment.

Referring to FIG. 1, the display apparatus includes a receiver 110, a detector 120, a storage unit 130, a video processor 141, and a display unit 150.

The receiver 110 receives content data, and the detector 120 detects content type information of the content data received through the receiver 110. The storage unit 130 (e.g., a storage) stores frame size information matching with each content type. The video processor 141 forms a content frame having a frame size corresponding to the content type information detected through the detector 120, by using the frame size information stored in the storage unit 130. The display unit 150 (e.g., a display) displays the content frame having the frame size adjusted through the video processor 141.

In detail, the receiver 110 may receive content data from at least one of a source apparatus such as a set-top box, a broadcast transmitting apparatus, and an Internet terminal apparatus. Also, the content data may content types related to a graphic, a photo, a moving picture, and a game. If content data of one of the content types related to the graphic, the photo, the moving picture, and the game is received through the receiver 110, the detector 120 detects content type information of the received content data. In detail, the content data includes content type information of a content which is to be displayed on a screen through the display unit 150. According to an exemplary embodiment, if content data is received from a source apparatus through a High Definition Multimedia Interface (HDMI), an audio visual interleaved (AVI) infoframe including content type information may be included in the content data. Therefore, the detector 120 may acquire an AVI infoframe from the received content data and detect content type information of a content, which is to be displayed on the screen, from the acquired AVI infoframe.

If the content type information is detected through the detector 120 as described above, the video processor 141 acquires frame size information corresponding to the detected content type information with reference to the storage unit 130 which stores the frame size information matching with each of the content types. After that, the video processor 141 forms a content frame having a frame size corresponding to the acquired frame size information. Here, the frame size information of each of the content types stored in the storage unit 130 is set and stored by a user. Therefore, the display apparatus may store the frame size information of each of the content types, which is set by the user through an input unit 170 (e.g., an input) and a controller 180, in the storage unit 130.

Meanwhile, the storage 130 according to an exemplary embodiment may store scaling information which is matched for each content type. In this case, the video processor 141 may adjust the size of the content to be displayed based on the scaling information stored in the storage 130. To do so, the video processor 141 may include a scaler (not shown). Specifically, if content type information is detected through the detector 120, the scaler (not shown) obtains from the storage 130 scaling information corresponding to the content type information detected from the detector 120. Subsequently, the scaler (not shown) may adjust the size of the content to be displayed based on the obtained scaling information.

The input unit 170 receives a setting command. If the setting command is input through the input unit 170, the controller 180 controls the display unit 150 to display a user interface (UI) which is used to set a frame size of each of the content types. According to an exemplary embodiment, the user may request setting of a frame size of moving picture content. If a command to set the frame size of the moving picture content is input through the input unit 170, the controller 180 controls the display unit 150 to display a UI which is used to set the frame size of the moving picture content. According to a control command, the display unit 150 displays the UI which is used to set the frame size of the moving picture content. If frame size setting information of the moving picture content is input through the input unit 170 when the UI to set the frame size of the moving picture content is displayed, the controller 180 stores frame size information of a moving picture content type input from the user in the storage unit 130.

If frame size setting information of each of the content types is input from the user through the input unit 170, the controller 180 may store the frame size information of each of the content types in the storage unit 130. Therefore, the video processor 141 may acquire frame size information related to the content type information detected by the detector 120 from the storage unit 130 and form a content frame having a frame size corresponding to the acquired frame size information.

In detail, if the content type information of the content data is detected as a moving picture content type, the video processor 141 may form a content frame having a frame greater than a size of a display screen of the display unit 150 according to the frame size information of the moving picture content stored in the storage unit 130. Therefore, as shown in FIG. 2, the display unit 150 may display a moving picture content, which is enlarged more than a real moving picture content displayed on the display screen, to display a moving picture content from which noise has been removed.

Figure 2:
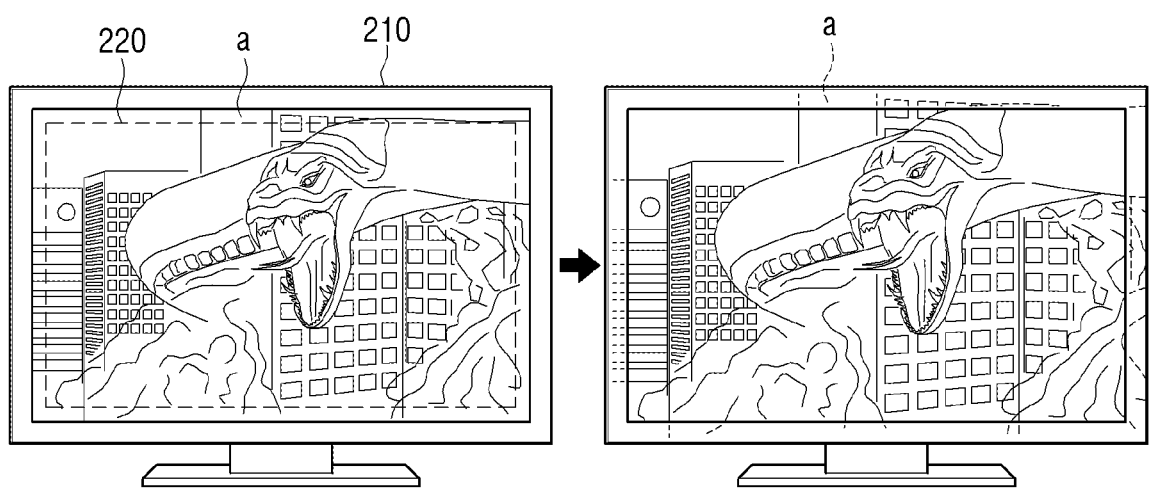
FIG. 2 is a view illustrating a moving picture content which is displayed in a size enlarged according to frame size information in a display apparatus, according to an exemplary embodiment.

FIG. 2 is a view illustrating a moving picture content which is displayed in a size enlarged according to frame size information in a display apparatus, according to an exemplary embodiment.

If content data is received from a source apparatus as on the left side of FIG. 2, the video processor 141 forms a content frame from the received content data. If the content frame is formed, the display apparatus 150 may display the corresponding content frame to display moving picture content 220 on a display screen 210. However, an outer area 'a' of the moving picture content 220 displayed on the display screen 210 includes a large amount of noise. Therefore, a user may not view the moving picture content 220 in an optimal state. Therefore, the video processor 141 forms a content frame of the moving picture content 220 in a frame size greater than a size of the display screen 210 of the display unit 150 in order to remove the noise of the outer area 'a' of the moving picture content 220. As a result, as shown on the right side of FIG. 2, the display unit 150 may display a remaining area of the moving picture content 220, except the outer area 'a' of the moving picture content 220 including the noise, on the display screen 210.

According to an exemplary embodiment, the user may set the moving picture content 220 to be enlarged within an enlargement range between 0% and 10%. For example, if a setting command with respect to an enlargement condition of 20% from the enlargement range between 0% and 10% is input from the user, the controller 180 stores frame size information set under the enlargement condition of 20% in the storage unit 130. Therefore, the video processor 141 may form a content frame of the moving picture content 220 corresponding to the frame size information set under the enlargement condition of 20%. As a result, the display unit 150 displays only a content frame corresponding to a size of 98% on the display screen 210. Therefore, the outer area 'a' of the moving picture content 220 enlarged by a size of 2% may be removed from the display screen 210.

If the content type information of the content data is detected as a graphic content type related to a webpage, the video processor 141 may form a content frame having a frame corresponding to the size of the display screen of the display unit 150 according to frame size information of a webpage-related graphic content stored in the storage unit 130.

According to an exemplary embodiment, the user may set the webpage-related graphic content to be enlarged within an enlargement range between 0% and 100%. If a setting command with respect to an enlargement condition of 100% from the enlargement range between 0% and 100% is input from the user, the controller 180 stores frame size information set under the enlargement condition of 100% in the storage unit 130. Therefore, the video processor 141 may form a content frame of the webpage-related graphic content corresponding to the frame size information set under the enlargement condition of 100%. In other words, the video processor 141 may form a content frame having a frame size corresponding to the size of the display screen with reference to a display area of a window control icon formed on an upper part of a side of the webpage-related graphic content and a vertex area of the display screen. Therefore, the display unit 150 may display the webpage-related graphic content on a whole part of the display screen.

According to another exemplary embodiment, the display apparatus may further include an audio processor 143 and an audio output unit 160 (e.g., an audio output). The audio processor 143 detects audio data of the content data received through the receiver 110 to generate an audio signal. The audio output unit 160 outputs the audio signal generated by the audio processor 143 through an output unit such as a speaker. In detail, the audio processor 143 acquires audio setting information related to the audio data of the content data from the storage unit 130 which stores the audio setting information. The audio processor 143 may generate an audio signal having an output characteristic corresponding to the acquired audio setting information.

According to an exemplary embodiment, the user may request an audio setting for each type of audio. For example, the user may request an audio setting according to each audio genre and each content type or may request a setting of an equalizer adjustment. If such an audio setting command is input through the input unit 170, the controller 180 controls the display unit 150 to display a UI which is used to set an audio. According to a control command, the display unit 150 displays the UI which is used to set the audio. If setting information according to each audio genre or each content type, or with respect to an equalizer adjustment is input through the input unit 170 as described above when the UI to set the audio is displayed, the controller 180 stores the audio setting information input from the user in the storage unit 130.

Therefore, if the audio data of the received content data is detected, the audio processor 143 acquires the audio setting information related to the detected audio data from the storage unit 130. After that, the audio processor 143 may generate and output the audio signal corresponding to the acquired audio setting information. Therefore, the audio output unit 160 may output the audio signal generated by the audio processor 143 through the output unit such as the speaker, so that the user hears audio in various genre forms or audio output forms.

The elements of the display apparatus have been described in detail. An operation of transmitting content data from a source apparatus to a display apparatus will now be described in detail.

Figure 3:
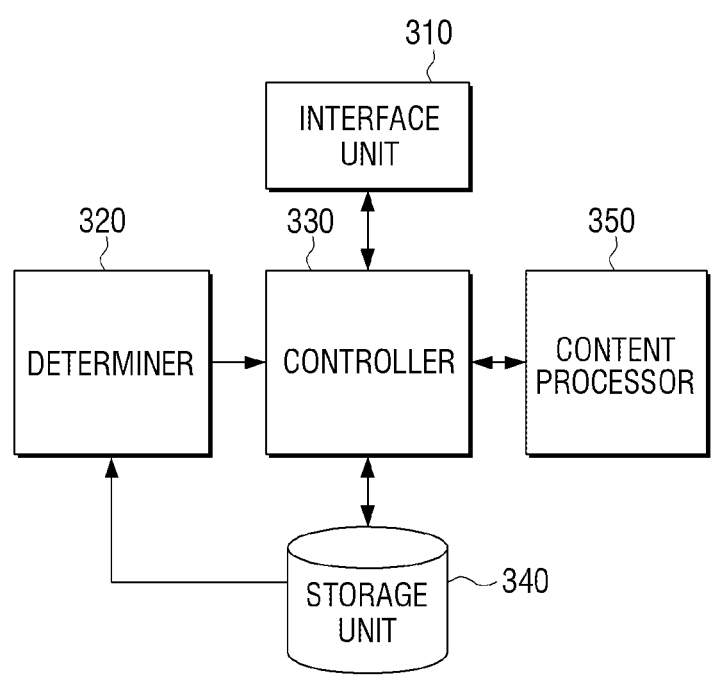
FIG. 3 is a block diagram of a source apparatus which provides content to a display apparatus, according to an exemplary embodiment.

FIG. 3 is a block diagram of a source apparatus which provides content to a display apparatus, according to an exemplary embodiment.

Referring to FIG. 3, the source apparatus includes an interface unit 310 (e.g., an interface), a determiner 320, and a controller 330. The interface unit 310 receives characteristic information of the display apparatus. Here, the characteristic information of the display apparatus may include frame size information set according to each content type in the display apparatus, screen size information of the display apparatus, etc. Therefore, if the characteristic information of the display apparatus is received from the display apparatus through the interface unit 310, the controller 330 stores the received characteristic information of the display apparatus in a storage unit 340 (e.g., a storage).

The determiner 320 determines whether a frame size of a content to be transmitted to the display apparatus is adjustable, by using the characteristic information of the display apparatus stored in the storage unit 340. If the determiner 320 determines that the frame size of the content is adjustable, the controller 330 controls the interface unit 310 to transmit content data including content type information of the corresponding content to the display apparatus. Here, the content data may be at least one of a content related to a graphic, a photo, and a game and an audio content and may include content type information of each content type.

For example, if content data of moving picture content is transmitted through the interface unit 310 according to a request of a user, the determiner 320 checks whether frame size information of the moving picture content exists, with reference to the characteristic information of the display apparatus stored in the storage unit 340. If it is determined that the frame size information of the moving picture content exists, the determiner 320 determines that a frame size of the moving picture content is adjustable in the display apparatus. If the determiner 320 determines that the frame size of the moving picture content is adjustable, the controller 330 controls the interface unit 310 to transmit content data including content type information of the moving picture content to the display apparatus. According to an exemplary embodiment, if content data is transmitted to the display apparatus through a HDMI, the controller 330 may include an AVI infoframe including the content type information in the content data. Therefore, the display apparatus may detect content type information of a content, which is to be played on a display screen, from the AVI infoframe of the content data.

According to another exemplary embodiment, the source apparatus may further include a content processor 350 which adjusts a frame size of content. In detail, if the determiner 320 determines that the frame size of the content to be transmitted to the display apparatus is not adjustable, the controller 330 controls the content processor 350 to adjust the frame size of the content according to a size of a display screen of the display apparatus and a type of the content with reference to the characteristic information of the display apparatus stored in the storage unit 340. If the frame size of the corresponding content is adjusted by the content processor 350 according to the above control command, the controller 330 controls the interface unit 310 to transmit content data having the adjusted frame size to the display apparatus.

For example, if it is determined that the frame size of the moving picture content is not adjustable in the display apparatus, the controller 330 controls the content processor 350 to adjust the frame size of the moving picture content according to the size of the display screen of the display apparatus and a type of the moving picture content. According to the above control command, the content processor 350 may adjust the frame size of the moving picture content so that the moving picture content has a frame greater than the size of the display screen of the display apparatus. In other words, the content processor 350 may enlarge the frame size of the moving picture content to display only an area corresponding to a preset condition from a whole display area of the moving picture content displayed on the display screen of the display apparatus.

If the content processor 350 adjusts the frame size of the content as described above, the controller 330 may control the interface unit 310 to transmit content data having the adjusted frame size of the corresponding content to the display apparatus. As described above, the source apparatus may determine whether a frame size of each content type of the display apparatus is adjustable to adjust an unadjustable frame size of a content so that the unadjustable frame size of the corresponding content is appropriate for the size of the display screen of the display apparatus in order to provide the corresponding content to the display apparatus.

According to another exemplary embodiment, if the content processor 350 adjusts a frame size of content, the controller 330 may control the interface unit 310 to transmit content data including a message, which acknowledges that the frame size of the corresponding content has been adjusted, to the display apparatus. If the content data including the message, which acknowledges that the frame size of the content has been adjusted, is transmitted to the display apparatus as described above, the user may check that a content displayed in the display apparatus has been adjusted to be appropriate for the display screen of the display apparatus.

The elements of the source apparatus which provides content to the display apparatus have been described in detail. A method of providing content in the display apparatus and a method of providing content from the source apparatus to the display apparatus will now be described in detail.

Figure 4:
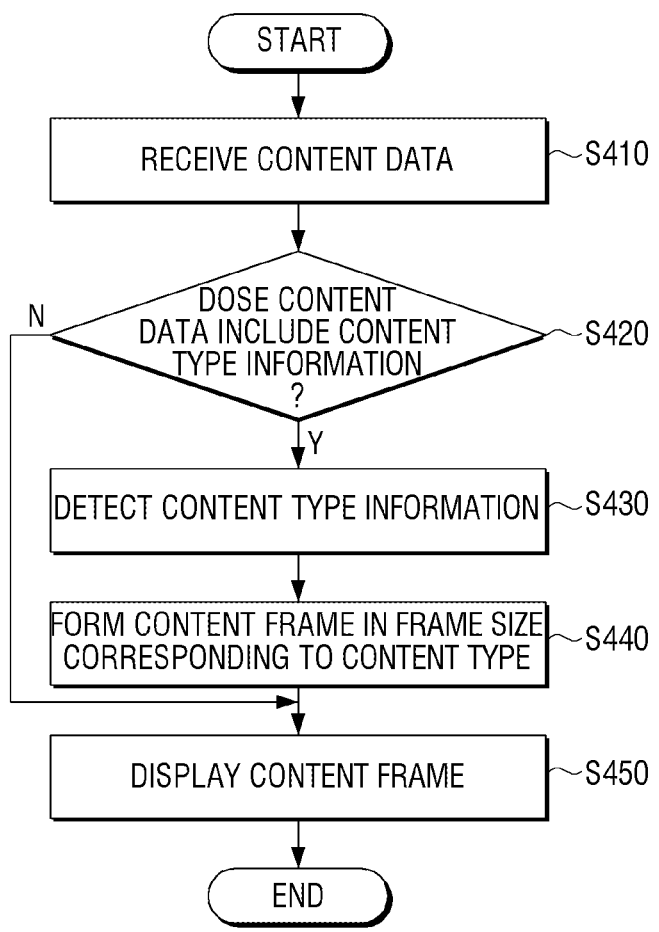
FIG. 4 is a flowchart illustrating a method of providing content in a display apparatus, according to an exemplary embodiment.

FIG. 4 is a flowchart illustrating a method of providing content in the display apparatus, according to an exemplary embodiment.

Referring to FIG. 4, in operation S410, the display apparatus receives content data from at least one of a source apparatus such as a set-top box, a broadcast transmitting apparatus, and an Internet terminal apparatus. Here, the content data may be a content type related to a graphic, a photo, a moving picture, and a game. If content data of one of the content is received, the display apparatus checks whether the received content data includes content type information, in operation S420. If it is determined that the received content data does not include the content type information, the display apparatus forms a content frame from the received content data and displays the corresponding content frame on a screen.

If it is determined that the received content data includes the content type information, the display apparatus detects the content type information from the content data in operation S430. According to an exemplary embodiment, if the content data is received from the source apparatus through a Direct Media Interface (DMI), the content data may include an AVI infoframe including the content type information. Therefore, the display apparatus may acquire the AVI infoframe from the received content data and detect content type information of a content to be displayed on the screen from the acquired AVI infoframe.

If the content type information is detected from the received content data as described above, the display apparatus forms a content frame having a frame size corresponding to the detected content type information with reference to a storage unit which stores frame size information matching with each content type, in operation S440. Next, the display apparatus displays the content frame in operation S450. Here, the frame size information of each content type stored in the storage unit may be set and stored by a user, i.e., may be stored through a method as illustrated in FIG. 5.

Figure 5:
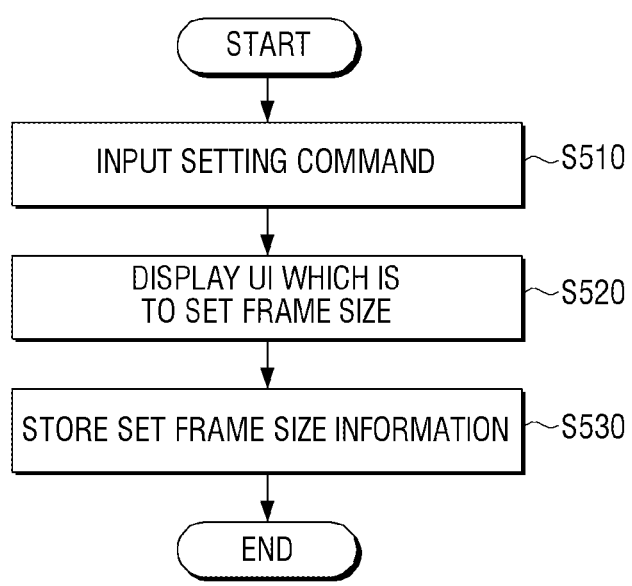
FIG. 5 is a flowchart illustrating a method of storing frame size information of each content type in a display apparatus, according to an exemplary embodiment.

FIG. 5 is a flowchart illustrating a method of storing frame size information of each content type in the display apparatus, according to an exemplary embodiment.

Referring to FIG. 5, in operation S510, the display apparatus receives a setting command from a user. In operation S520, the display apparatus displays a UI, which is used to set a frame size of each content type, on a screen. According to an exemplary embodiment, the user may request setting of a frame size of moving picture content. If a setting command to set the frame size of the moving picture content is input, the display apparatus displays a UI which is used to set the frame size of the moving picture content. If frame size setting information of the moving picture content is input when the UI to set the frame size of the moving picture content is displayed, the display apparatus stores frame size information of a moving picture content type input from the user in a storage unit in operation S530.

If frame size setting information of each content type is input from the user as described above, the display apparatus may store the input frame size information of each content type in the storage unit. If the frame size information of each content type is stored in the storage unit according to a request of the user, the display apparatus may acquire frame size information related content type information from the storage unit and form a content frame having a frame size corresponding to the acquired frame size information through operation S440 of FIG. 4.

In further detail, if the content type information of the received content data is detected as a moving picture content type, the display apparatus may form a content frame having a frame greater than a size of a display screen according to the frame size information of the moving picture content stored in the storage unit. Therefore, as described with reference to FIG. 2, the display apparatus may display a moving picture content, which is enlarged more than the moving picture content actually displayed on the display screen, to display a moving picture content from which noise has been removed.

According to an exemplary embodiment, the user may set the moving picture content to be enlarged within an enlargement range 0% and 10%. Therefore, the display apparatus may form a content frame of the moving picture content corresponding to frame size information set under an enlargement condition of 2%. As a result, the display apparatus may display only a content frame corresponding to a size of 98% on the display screen and may remove an outer area of the moving picture content, which is enlarged by a size of 2%, from the display screen.

If the content type information of the received content data is detected as a webpage-related graphic content type, the display apparatus may form a content frame having a frame corresponding to a size of the display screen according to frame size information of a webpage-related graphic content.

According to an exemplary embodiment, the user may set the webpage-related graphic content to be enlarged within an enlargement range between 0% and 100%. If a setting command with respect to an enlargement condition of 100% from the enlargement range between 0% and 100% is input from the user, the display apparatus stores frame size information, which is set under the enlargement condition of 100%, in the storage unit. Therefore, the display apparatus may form a content frame of the webpage-related graphic content so that the content frame corresponds to the frame size information set under the enlargement condition of 100%. In other words, the display apparatus may form a content frame having a frame size corresponding to the size of the display screen with reference to a display area of a window control icon formed on an upper part of a side of the webpage-related graphic content and a vertex area of the display screen. Accordingly, the display apparatus may display the webpage-related graphic content on a whole part of the display screen.

As described above, the display apparatus may adaptively adjust a screen size of content according to frame setting information set related to content type information of content data to display the content in an optimal state.

Figure 6:
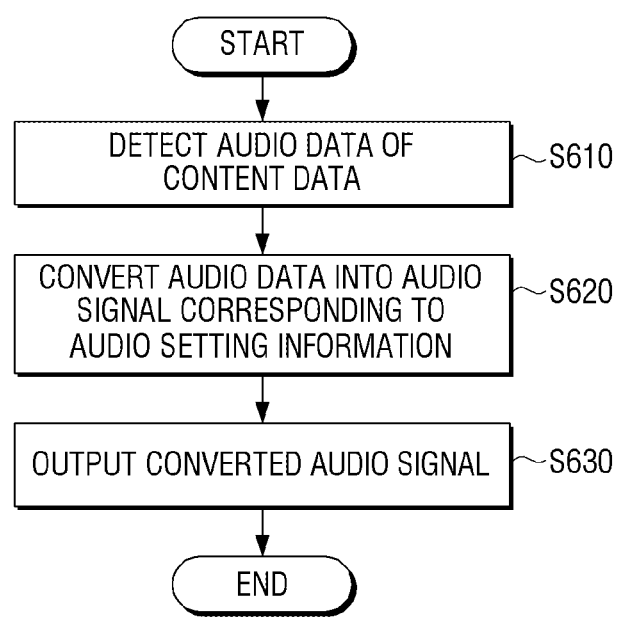
FIG. 6 is a flowchart illustrating a method of outputting audio data of content data in a display apparatus, according to an exemplary embodiment.

If the received content data includes audio data, the display apparatus may adjust the audio data through a method illustrated in FIG. 6.

FIG. 6 is a flowchart illustrating a method of outputting audio data of content data in the display apparatus, according to an exemplary embodiment.

Referring to FIG. 6, if content data is received through operation S410 of FIG. 4, the display apparatus determines whether the received content data includes audio data. If it is determined that the content data includes the audio data, the display apparatus detects the audio data from the content data in operation S610. After that, the display apparatus acquires audio setting information related the audio data of the content data from a storage unit which stores the audio setting information. In operation S620, the display apparatus converts the audio data into an audio signal having an output characteristic corresponding to the acquired audio setting information. In operation S630, the display apparatus outputs the audio signal through an output unit such as a speaker.

According to an exemplary embodiment, a user may request audio setting with respect to each audio type. For example, the user may request audio setting according to each content type or setting of an equalizer adjustment. If an audio setting command as described above is input, the display apparatus displays a UI which is used to set an audio as described above. If setting information with respect to each audio genre, each content type or an equalizer adjustment is input from the user when the UI to set the audio is displayed, the display apparatus stores audio setting information input from the user in the storage unit.

Therefore, if the audio data of the received content data is detected, the display apparatus may acquire audio setting information related to the detected audio data and convert the audio data into an audio signal corresponding to the acquired audio setting information. If the audio data is converted into the audio signal corresponding to the audio setting information, the display apparatus may output the audio signal through the output unit such as the speaker. Therefore, the user may hear an audio in various genre forms or an audio output form The method of providing content in the display apparatus has been described in detail. A method of providing content from the source apparatus to the display apparatus will now be described in detail.

Figure 7:
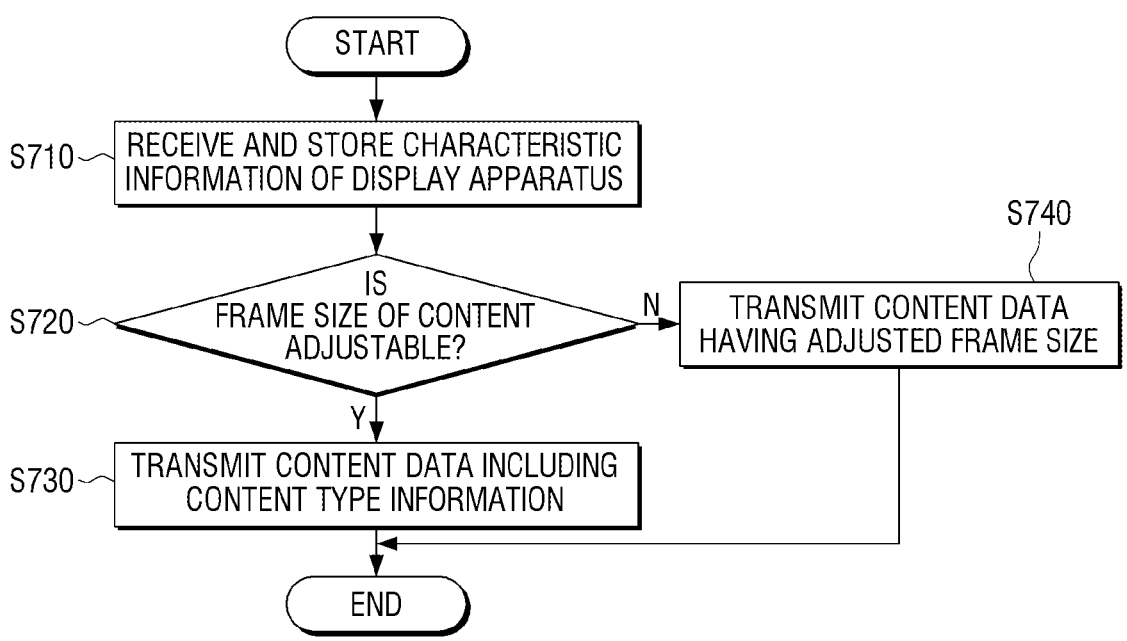
FIG. 7 is a flowchart illustrating a method of providing content from a source apparatus to a display apparatus, according to an exemplary embodiment.

FIG. 7 is a flowchart illustrating a method of providing content from the source apparatus to the display apparatus according to an exemplary embodiment.

Referring to FIG. 7, in operation S710, the source apparatus receives characteristic information of the display apparatus from the display apparatus and stores the characteristic information. Here, the characteristic information of the display apparatus may include frame size information settings according to each content type by the display apparatus, screen size information of the display apparatus, etc. Therefore, the source apparatus may be connected to the display apparatus to receive the characteristic information of the display apparatus or may receive the characteristic information whenever the characteristic information is updated. If the characteristic information of the display apparatus is received from the display apparatus, the source apparatus stores the characteristic information of the display apparatus in a storage unit.

In operation S720, the source apparatus checks whether a frame size of a content to be transmitted to the display apparatus is adjustable, by using the characteristic information of the display apparatus stored in the storage unit, in order to transmit the content to the display apparatus according to a request of the user. If it is determined that the frame size of the content is adjustable, the source apparatus transmits content data including content type information of the content to the display apparatus in operation S730. Here, the content data may be at least one of a content related to a graphic, a photo, a moving picture, a game, and an audio content and may include content type information of each content type.

For example, if the source apparatus transmits content data of moving picture content to the display apparatus according to a request of the user, the source apparatus checks whether frame size information of the moving picture content exists, with reference to the characteristic information of the display apparatus stored in the storage unit. If it is determined that the frame size information of the moving picture content exists, the source apparatus determines that the frame size of the moving picture content is adjustable in the display apparatus. If it is determined that the frame size of the moving picture content is adjustable, the source apparatus transmits content data including content type information of the moving picture content to the display apparatus.

According to an exemplary embodiment, if the source apparatus transmits content data to the display apparatus through a HDMI, the source apparatus may include an AVI infoframe including content type information in the content data. Therefore, the display apparatus may detect content type information of a content to be played on a display screen from the AVI infoframe of the content data.

If it is determined in operation S720 that the frame size of the content to be transmitted to the display apparatus is not adjustable, the source apparatus adjusts the frame size of the corresponding content according to a size of the display screen and a type of the correspond content and transmits the content having the adjusted frame size to the display apparatus in operation S740. For example, if it is determined that the frame size of the moving picture content is not adjustable in the display apparatus, the source apparatus adjusts the frame size of the moving picture content according to the size of the display screen of the display apparatus and a type of the moving picture content with reference to the characteristic information of the display apparatus stored in the storage unit. After that, the source apparatus may adjust the frame size of the moving picture content so that the moving picture content has a frame greater than the size of the display screen of the display apparatus. In other words, the source apparatus may enlarge the frame size of the moving picture content to display only an area corresponding to a preset condition from a whole display area of the moving picture content displayed on the display screen of the display apparatus.

If the frame size of the content is adjusted as described above, the source apparatus transmits content data having the adjusted frame size of the corresponding content to the display apparatus. If the source apparatus determines that a frame size of each content type of the display apparatus is not adjustable, the source apparatus may adjust the frame size of the corresponding content so that the frame size of the corresponding content is appropriate for the size of the display screen of the display apparatus and provide the content having the adjusted frame size to the display apparatus.

According to another exemplary embodiment, if a frame size of content is adjusted, the source apparatus may further include a message, which acknowledges that the frame size of the corresponding content has been adjusted, in content data and then transmit the content including the message to the display apparatus. Therefore, the user may check that a content displayed on the display apparatus has been adjusted to be appropriate for the display screen of the display apparatus.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A source device for providing a content to a display device comprising:
an interface; and
a controller configured to:
receive feature information of the display device from the display device through the interface, the feature information comprising information related to a screen size of the display device,
adjust a frame size of a content frame based on the screen size of the display device and a type of the content, and
control the interface to transmit content data including the content frame of the adjusted frame size to the display device,
wherein the content type comprises at least a moving picture content type, and
wherein the adjusted frame size is larger than the screen size of the display if the content type is the moving picture content type.

2. The source device according to claim 1, further comprising:
a storage storing frame size adjustment information for each content type,
wherein the controller is configured to:
obtain frame adjustment information corresponding to the content type of the content from the storage, and
adjust the frame size of the content based on the frame adjustment information and the screen size of the display device.

3. The source device according to claim 1, wherein based on identifying that adjusting the frame size by the display device is impossible, the controller is configured to adjust the frame size of the content frame based on the screen size of the display device and the content type.

4. The source device according to claim 1, wherein based on identifying that adjusting the frame size by the display device is possible based on the feature information, the controller is configured to control information on the content type of the content to be transmitted to the display device.

5. The source device according to claim 4, wherein based on identifying that the feature information comprises frame size information related to the content type, the controller is configured to identify that the display device is capable of adjusting a frame size.

6. The source device according to claim 1, wherein the interface is an HDMI interface, and
wherein the controller is configured to control the interface to transmit the content data comprising AVI infofframe which includes information on the content type.

7. The source device according to claim 1, wherein the controller is configured to control the interface to transmit a message indicating that the frame size of the content frame is adjusted to the display device through the interface.

8. A control method of a source device for providing a content to a display device via an interface, the control method comprising:
receiving feature information of the display device from the display device, the feature information comprising information related to a screen size of the display device,
adjusting a frame size of a content frame based on the screen size of the display device and a type of the content, and
transmitting content data including the content frame of the adjusted frame size to the display device,
wherein the content type comprises at least a moving picture content type, and
wherein the adjusted frame size is larger than the screen size of the display if the content type is the moving picture content type.

9. The control method according to claim 8, wherein the adjusting the frame size of the content frame comprises:
obtaining frame adjustment information corresponding to the content type of the content from a pre-stored frame size adjustment information, and
adjusting the frame size of the content based on the frame adjustment information and the screen size of the display device.

10. The control method according to claim 8, wherein the adjusting the frame size of the content frame comprises:
based on identifying that that adjusting the frame size by the display device is impossible, adjusting the frame size of the content frame based on the screen size of the display device and the content type.

11. The control method according to claim 8, further comprising:
based on identifying that adjusting the frame size by the display device is possible based on the feature information, transmitting information on the content type of the content to the display device.

12. The control method according to claim 11, further comprising:
based on identifying that the feature information comprises frame size information related to the content type, identifying that the display device is capable of adjusting a frame size.

13. The control method according to claim 8, wherein the interface is an HDMI interface, and
wherein the transmitting the content data transmitted to the display device comprises AVI infoframe which includes information on the content type.

14. The control method according to claim 8, further comprising:
transmitting a message indicating that the frame size of the content frame is adjusted to the display device through the interface.

15. A non-transitory computer readable recording medium having embodied thereon a program, which when executed by a processor of a source device causes the source device to execute a method of providing a content to a display device from the source device via an interface, the method including:
receiving feature information of the display device from the display device, the feature information comprising information related to a screen size of the display device,
adjusting a frame size of a content frame based on the screen size of the display device and a type of the content, and
transmitting content data including the content frame of the adjusted frame size to the display device,
wherein the content type comprises at least a moving picture content type, and wherein the adjusted frame size is larger than the screen size of the display if the content type is the moving picture content type.

16. The non-transitory computer readable recording medium according to claim 15, wherein the adjusting the frame size of the content frame comprises:
   obtaining frame adjustment information corresponding to the content type of the content from a pre-stored frame size adjustment information, and
   adjusting the frame size of the content based on the frame adjustment information and the screen size of the display device.

17. The non-transitory computer readable recording medium according to claim 15, wherein the adjusting the frame size of the content frame comprises:
   based on identifying that that adjusting the frame size by the display device is impossible, adjusting the frame size of the content frame based on the screen size of the display device and the content type.

18. The non-transitory computer readable recording medium according to claim 15, further comprising:
   based on identifying that adjusting the frame size by the display device is possible based on the feature information, transmitting information on the content type of the content to the display device.

19. The non-transitory computer readable recording medium according to claim 18, further comprising:
   based on identifying that the feature information comprising frame size information related to the content type, identifying that the display device is capable of adjusting a frame size.

20. The control method according to claim 15, wherein the interface is an HDMI interface, and
   wherein the transmitting the content data transmitted to the display device comprises AVI infoframe which includes information on the content type.

* * * * *